E. C. HESSE.
SNAP HOOK.
APPLICATION FILED JUNE 13, 1921.

1,390,129.

Patented Sept. 6, 1921.

Inventor:
Emil C. Hesse.

UNITED STATES PATENT OFFICE.

EMIL C. HESSE, OF CHICAGO, ILLINOIS.

SNAP-HOOK.

1,390,129.  Specification of Letters Patent.  Patented Sept. 6, 1921.

Application filed June 13, 1921. Serial No. 477,123.

*To all whom it may concern:*

Be it known that I, EMIL C. HESSE, a citizen of the United States, residing at Chicago, in the county of Cook and State of Illinois, have invented certain new and useful Improvements in Snap-Hooks, of which the following is a specification.

This invention relates to a snap hook of general utility, the same as is disclosed in my Patent No. 1,375,459 granted April 19, 1921.

An embodiment of my invention is shown in the drawing in the manner following:

The present device is formed from a body in the shape of a rod or wire having one end 5 turned to provide a hook, the approximate end of the rod being beveled as at 6. Proceeding from the hook end the rod extends through a section 7 to the opposite end of the device where it is bent as at 8 through 180° to provide an eye 9. The rod extremity 10 is bent upon itself to provide a section which lies adjacent the body section 7, but slightly spaced therefrom, and serving also to close the eye, as shown.

Figure 1:
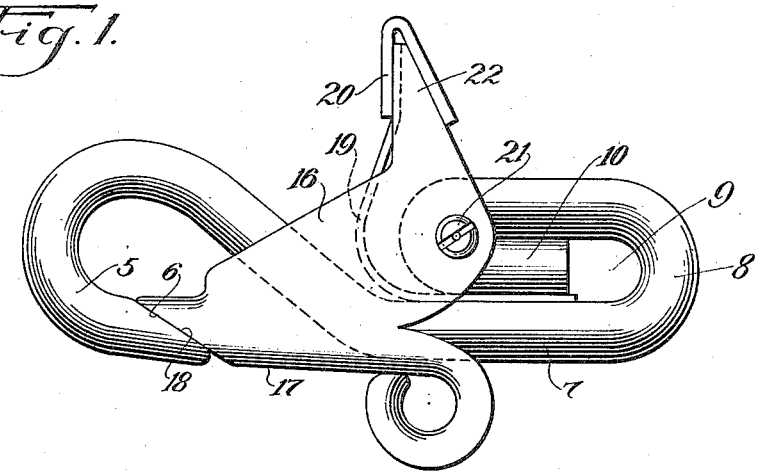
Figure 1 is a side elevation of the hook when closed.
Figure 2:
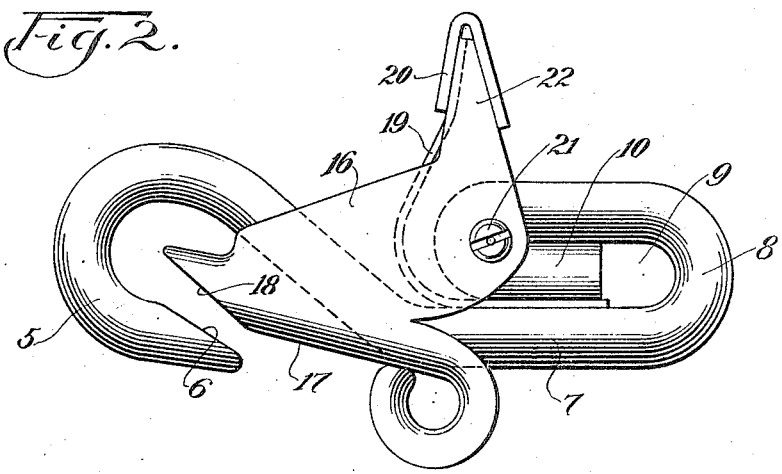
Fig. 2 is a similar view of the hook when open.
Figure 3:
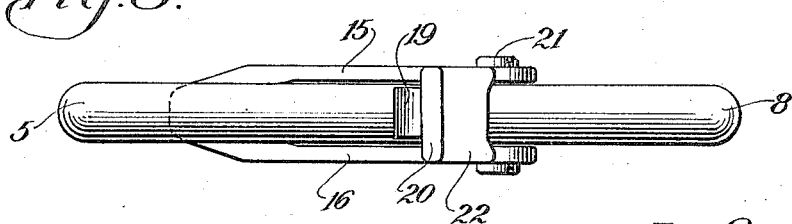
Fig. 3 is a plan view thereof.

Associated with a structure of this kind is a rocker frame having side walls 15 and 16 which lie upon either side of the hook body, these walls being connected by a transverse wall 17 which at 18 is formed to coöperate with the beveled end 6 of the hook. Normally the frame is held in a position as shown in Fig. 1 where the hook is closed, this being accomplished by a leaf spring 19 that is clamped between the body section 7 and its extremity 10, the spring engaging also with the rocker frame as at 20, at which place is extended a member between the side walls of the frame. A pin 21 passes transversely through the hook body at the bend adjacent its extremity 10 and connects with the side walls of the rocker frame to provide a pivotal mounting therefor such that the frame may be swung to a position such as is shown in Fig. 2 where the hook is opened. The end 22 of the rocker frame which is engaged by the spring constitutes a finger hold which facilitates the use of the hook.

It will be apparent that the device just described provides a snap hook that is normally closed by the rocker frame which is acted upon by the spring. My invention is characterized by a hook body which is formed to provide not only a hook at one end, but also an eye at the other, this latter part being closed by the body extremity which is bent upon itself in such a manner as to provide a smaller opening for the reception of the pin which is used to pivotally connect the rocker frame to the device.

I claim:

1. A hook of the kind described, comprising a body that is bent upon itself to provide two parallel sections, a spring clamped between said sections and held thereby, a rocker frame engaged by the spring and having spaced walls on either side of the hook body pivotally connected thereto, the hook body having at one end a hook adapted to be closed by the frame under the tension of the spring, substantially as described.

2. A snap hook of the kind described, comprising a body bent to provide at one end a hook and at its other end turned upon itself to provide parallel sections, a rocker frame coöperating with the hook and formed with spaced walls adapted to lie at either side of the hook body and pivoted thereto so as to move either to close or open the hook, and a spring clamped in place between the parallel sections of the hook body engaging with the rocker frame to normally urge the same to closed position relative to the hook, substantially as described.

3. A hook of the kind described, comprising a body one end of which is in the form of a hook, and the other end of which is bent to provide parallel body sections, a rocker frame pivoted to the body and having a portion of itself adapted to close the open hook end of the body, and a spring clamped between the parallel sections of the body and engaged with the rocker frame in a manner to normally hold the same in closed position relative to the hook, substantially as described.

4. A hook of the kind described comprising a metallic bar that is bent at one end to provide an open hook, its other end being bent upon itself to provide an eye, the proximate bar extremity being again bent upon itself to close the eye and lie parallel with and adjacent to the adjoining portion of the hook body, a spring clamped between the bent extremity of the body and the adjacent section thereof, and means engaged by the spring movably mounted on the hook body adapted to close its open hook end, substantially as described.

EMIL C. HESSE.

Witness:
ERNST UHLICH, Jr.